United States Patent
Walkingshaw et al.

(10) Patent No.: US 7,422,220 B2
(45) Date of Patent: Sep. 9, 2008

(54) EVACUATION SLED AND TEMPORARY SURGE CAPACITY BED

(75) Inventors: Nathan R. Walkingshaw, Bountiful, UT (US); Steven B. Ostrowski, Toronto (CA)

(73) Assignee: Descent Control Systems, Inc., West Jordan, UT (US)

( * ) Notice: Subject to any disclaimer, the term of this patent is extended or adjusted under 35 U.S.C. 154(b) by 133 days.

(21) Appl. No.: 11/617,061

(22) Filed: Dec. 28, 2006

(65) Prior Publication Data

US 2007/0278754 A1    Dec. 6, 2007

Related U.S. Application Data

(60) Provisional application No. 60/811,253, filed on Jun. 6, 2006.

(51) Int. Cl.
| B62B 15/00 | (2006.01) |
| A45F 4/06 | (2006.01) |
| A61G 1/00 | (2006.01) |

(52) U.S. Cl. .................. 280/18; 280/18.1; 280/19; 280/20; 280/24; 224/156; 224/158

(58) Field of Classification Search ............ 280/18, 280/18.1, 19, 20, 24; 224/156, 158
See application file for complete search history.

(56) References Cited

U.S. PATENT DOCUMENTS

| 3,222,080 | A | * | 12/1965 | Kinraide | 280/18 |
| 4,173,351 | A | * | 11/1979 | Hetland | 280/19 |
| 4,283,068 | A | * | 8/1981 | Keyser | 280/19 |
| 5,249,321 | A | | 10/1993 | Graf | |
| D421,413 | S | | 3/2000 | Calkin | |
| 6,053,534 | A | * | 4/2000 | Timmerman | 280/845 |
| 6,364,324 | B1 | * | 4/2002 | Buchanan | 280/15 |
| 2002/0153680 | A1 | * | 10/2002 | Moore | 280/20 |
| 2005/0218611 | A1 | * | 10/2005 | Mehrmann | 280/18 |
| 2006/0061050 | A1 | | 3/2006 | Wolf et al. | |
| 2006/0213010 | A1 | | 9/2006 | Davis | |

OTHER PUBLICATIONS

Med Sled No One Left Behind, printed on Dec. 12, 2006 from: http://www.medsled.com/medsledmain1.html.

(Continued)

*Primary Examiner*—Christopher Ellis
*Assistant Examiner*—John R Olszewski
(74) *Attorney, Agent, or Firm*—Kirton & Mcconkie; Michael F. Krieger (57) ABSTRACT

A lightweight, strong, sturdy, and versatile evacuation sled is disclosed. The body of the sled may be manufactured from a single piece of material, stored flat, and folded into its functioning configuration. When folded, the sled has one or more straps that help hold it in its folded configuration and allow maneuvering or carrying the sled. The sled may be readily towed with a towing harness and may be moved down an incline, such as stairs, by means of a rope and belay device. The sled has a low coefficient of friction and is lightweight, allowing the sled to be readily moved and handled without requiring the assistance of multiple people. Additional sleds with foam inserts may be provided to carry equipment such as for life support. The sled may also provide surge capacity for facilities like hospitals, as the sled is designed to be inexpensive and essentially disposable.

20 Claims, 6 Drawing Sheets

OTHER PUBLICATIONS

Med Sled No One Left Behind Evacuation, 2006, ARC Products, LLC, available at: www.medsled.com.
Evacusled, 2006, Evacusled Inc., available at: http://www.evacusled.com/index.htm.
Evacusled, printed on Dec. 28, 2006 from http://www.evacusled.com/FAQ.htm.
Sked The "Only" Complete Rescue System, 2005, Skedco, Inc., available at: http://www.skedco.com/sk200.htm.
Sked Stretcher Fact Sheet, Skedco, Inc., printed on Dec. 28, 2006 from http://www.skedco.com.
The Sked Stretcher Instructions, Skedco, Inc., printed on Dec. 28, 2006 from www.skedco.com.

* cited by examiner

EVACUATION SLED AND TEMPORARY SURGE CAPACITY BED

CROSS-REFERENCE TO RELATED APPLICATIONS

This application claims priority to U.S. Provisional Patent Application No. 60/811,253, filed Jun. 6, 2006, and entitled "Evacuation Sled and Temporary Surge Capacity Bed."

BACKGROUND OF THE INVENTION

1. Field of the Invention

The present invention relates to rescue or evacuation devices for non-ambulatory or bedridden persons, and more particularly to an inexpensive, multi-use, storable evacuation bed that can be used to rapidly evacuate patients from a structure in an emergency and can then be used as a temporary bed to provide post-evacuation surge capacity.

2. Background and Related Art

Several attempts have been made to provide evacuation methods and systems that can be used at facilities such as rest homes, assisted living facilities, hospitals, and other multi-level facilities like hotels, motels, and large business buildings or complexes, among other locations. In these locations, sometimes large numbers of individuals must be evacuated in short periods of time in cases of emergency. Many times, a large percentage of individuals in these facilities who need evacuation are unable to walk and leave the facility under their own power. This may be due to the reason the persons are in the facility originally, or may be due to injuries sustained in the course of the emergency necessitating evacuation.

In recent years, with the increase in awareness of preparedness issues, including those surrounding the possibility of terrorist attack, more of these facilities have sought to improve their preparedness for such events. However, no method has been provided that adequately addresses all of the needs of these types of facilities on encountering an emergency. For example, a hospital seeking to evacuate patients might have a patient-to-staff ratio of five-to-one. A nursing home or other similar facility often has a patient-to-staff ratio approaching ten-to-one. In emergencies, staff members may become injured or abandon their duties, further exacerbating the patient-to-staff ratio. Therefore, any method for evacuation must be rapid and ideally should permit evacuation on a low rescuer-to-evacuee ratio.

In fires or an earthquake, debris often clogs hallways and elevators become unusable. To deal with this situation, an effective evacuation system must be able to traverse nearly any kind of terrain, and must be able to descend or even ascend stairways. In part because of the need to cover varying kinds of terrain and to facilitate evacuation with as few staff as possible, an evacuation mechanism should ideally be lightweight and maneuverable. An evacuation device should also roll or slide easily on most types of terrain to allow as few people as possible to transport an evacuee in most situations.

Many patients being evacuated have special needs. Sometimes patients have broken bones or other injuries that require protection from jostling, or have spinal or other injuries where too much flexibility in the evacuation device could cause further injury or unnecessary pain. To prevent this, an ideal evacuation device should be strong and reasonably rigid, and should protect the evacuee from rough contact with the evacuation environment as much as possible. At the extreme end of patient needs are those patients with severe injuries requiring persistent intensive care to prevent the patients' death. An effective evacuation device should permit such care to continue unabated during and after an evacuation so that any type of patient may be evacuated.

Potential evacuees come in all shapes and sizes, so an evacuation device should be acceptable for use with a broad range of patients. This becomes especially important as a patient is transported up or down stairs. Thus the evacuation device should be flexible in its use. Of course, hospitals and other facilities that need to provide for the possibility of rapid evacuation hope never to have to perform an evacuation and hope never to use their evacuation devices. Since it is anticipated that the devices will be used rarely if ever, an ideal device should be relatively inexpensive to manufacture and purchase.

Also because evacuation devices are only rarely used, they should be readily stored in a manner that does not consume expensive storage space. The storage should ideally occur in an accessible place that is close to the location where the evacuation mechanism will eventually be used. Thus the evacuation device should store in a compact manner in a location that is readily accessible and close to potential evacuees.

Many times, successful evacuation is not the end of the story. In a serious emergency where a hospital facility is damaged, for example, evacuation of the patients from the hospital is merely the first step. In an emergency such as an earthquake, the patients will likely have to be cared for at whatever location to which they have been evacuated, which might be the grounds outside the hospital. In addition, in a serious emergency, hundreds or thousands of additional patients might be arriving for treatment, besides those being evacuated. Therefore, an ideal evacuation device should be able to double as a temporary bed to provide surge capacity for patients, both evacuees and new patients, until a more permanent solution to the emergency capacity needs can be devised.

BRIEF SUMMARY OF THE INVENTION

A lightweight, strong, sturdy, and versatile evacuation sled is described. The surfaces of the sled may be manufactured from a single piece of material, stored flat, and then folded into the sled's functioning configuration. When folded, the sled has one or more straps that help hold the sled in its configuration and provide points for attachment to the sled and for maneuvering or carrying the sled. The sled may be readily towed with a towing harness and may be moved down an incline, such as stairs, by means of a rope and belay device. The sled has a low coefficient of friction and is lightweight. This allows the sled to be readily moved and handled without requiring the assistance of multiple people.

In cases where an evacuee requires a great deal of equipment for life support or other needs, additional sleds may be provided to carry that equipment. The equipment may be fitted into slots in a fitted foam insert that fills the sled. Then the additional sleds may be moved with the evacuee to allow maintained support even during and after evacuation.

The sled may provide surge capacity for facilities like hospitals, as the sled is designed to be inexpensive and essentially disposable. Because of its low cost, the sled may be purchased in a number sufficient to allow one sled per person, so evacuees may remain in their sleds post-evacuation until more a more permanent solution to bed needs can be provided. The sled may also be used to provide temporary surge capacity beds even if no evacuation occurs to provide capacity in the event of an emergency external to the hospital or other facility.

When not in use, the sled folds flat for convenient storage under a mattress, under a bed, in a closet, or stacked in a central location.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Referring now to the Figures, a description of the embodiments of the present invention will be given. It is expected that the present invention may take many other forms and shapes, hence the following disclosure is intended to be illustrative and not limiting, and the scope of the invention should be determined by reference to the appended claims.

Figure 1:
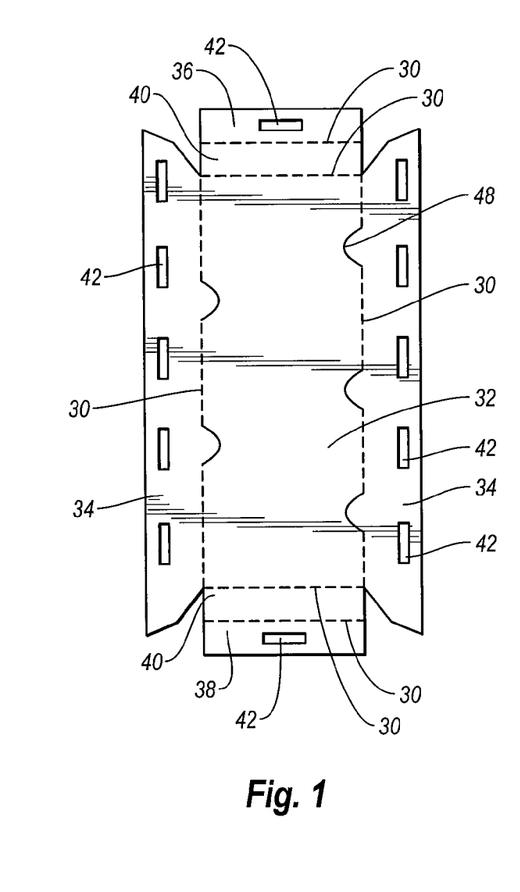
FIG. 1 shows a plan view of one embodiment of the evacuation sled.

FIG. 1 shows a plan view of one embodiment of the evacuation sled. As can be seen from the Figure, the surfaces of the sled may be manufactured or cut from a single piece of material. The sled is then folded along fold lines 30 to assume the folded configuration seen in FIGS. 2 and 3. To provide a lightweight but strong sled, the surfaces of the sled may be manufactured from a plastic material such as corrugated or non-corrugated polypropylene or polyethylene. The plastic material may be of various thicknesses depending on the plastic used and the anticipated weight of the evacuee, for example, to provide proper functionality. Four, six, and eight millimeter corrugated polypropylene have been anticipated as exemplary materials, but any other material that may be manufactured to provide a lightweight but strong sled might be used, including cellulose products.

As can be seen in FIG. 1, the sled has a bottom panel 32, a pair of side walls 34, a head wall 36, and a foot wall 38. Between the head wall 36 and the foot wall 38 are beveled portions 40, so that when the sled is folded into its folded configuration, the head and foot ends of the bottom surface have the beveled portion 40 that allows the sled to pass over small obstructions in the sled's path, such as stairs or debris. The walls are provided with several handle holes 42 that can be used as handles for the sled, or can be used to pass a rope or strap 44 through the holes to bring the sides together and/or serve as handles for the sled, as can be seen in FIG. 3.

Figures 2, 3:
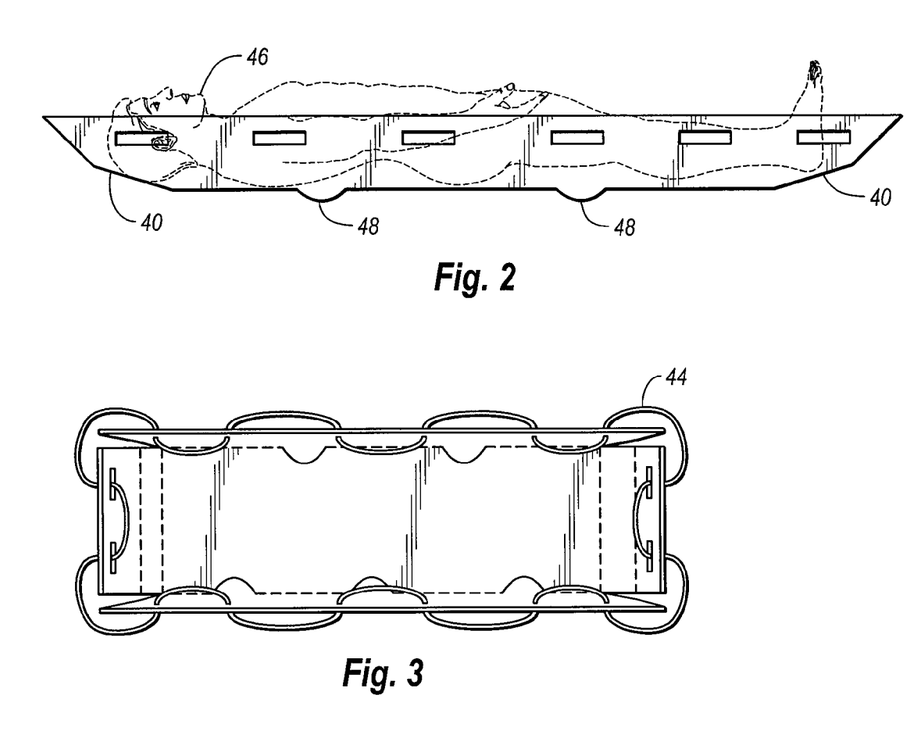
FIG. 2 shows a perspective side view of the embodiment of the evacuation sled from FIG. 1 in folded form.
FIG. 3 shows a perspective top view of the embodiment from FIG. 1 in folded form.

FIG. 2 shows a side perspective view of a sled in its folded configuration, with a person 46 shown in profile in dotted lines. This Figure also shows how the beveled portions 40 allow the sled to slide over obstructions in the sled's path. As the beveled portion 40 encounters an object first, the bevel allows the leading edge to rise over the obstruction and as horizontal motion continues, the bevel encounters the obstruction and pushes the sled up and over the obstruction without catching on the object. This may be assisted by providing the sled with a low coefficient of friction by the material used in manufacturing the sled (such as the above-mentioned corrugated polypropylene) or by a low-friction coating for the sled.

The sled in FIG. 2 shows several feet 48 that may be incorporated into the sled to provide some measure of air flow underneath the sled. Optionally, the sled may not have the feet provided, which simplifies manufacture, as additional cuts are not required. FIG. 3 shows a perspective view of the folded sled from above, showing how the walls 34, 36, 38 come together in the folded configuration to form a functioning sled. Rope or strap 44 may also be seen, showing how the rope or strap 44 may pass through handle holes 42 to provide support for the folded configuration. Rope or strap 44 may also provide a means for handling the sled, as a rescuer can manipulate the sled by grabbing on to the rope or strap 44. As can be appreciated from FIG. 3, pulling on one location of the rope or strap 44 will cause the tension of the rope or strap 48 to cinch up the walls of the sled into a tight functioning position. As may also be appreciated from the Figure, the rope or strap 44 conveniently provides various points at which the rope may be grabbed to help transport the evacuee.

For example, if the evacuee is being transported by a single staff member, the staff member might grab the rope or strap 44 at the two corners at either the head or foot of the sled, and then drag the sled and evacuee where needed. If two staff members are available, such as for descending stairs, the evacuee may be physically lifted by grabbing the strap at the corners at either end of the sled. If the patient is larger, three or four staff members may grab the rope or strap 44 at the corners. For extremely large individuals, additional staff members may be added, grabbing the rope or strap 44 at additional loops of the rope or strap 44 between handle holes 42.

Although not shown in FIGS. 1-3, the walls of the sled may be reinforced. For example, a separate insert may be attached around or to each handle hole 42 to reinforce the handle holes 42 and prevent accidental tearing or damage. Or, the walls may be extended to fold over themselves an additional time so as to provide a double layer of thickness for the walls or a portion thereof that provides additional support for the handle holes.

As may be readily appreciated, the sled may be manufactured in various sizes and shapes to accommodate different individuals. For example, a smaller sled might be manufactured to fit children for children's hospitals. Or a smaller sled might be desirable for other small individuals. A larger sled might be manufactured to accommodate larger individuals. The sled might be varied in length or width as necessary. Or the sled might be varied in thickness, as a smaller, lighter individual would not need the added strength provided by a thicker sled, where a larger individual would.

As can be appreciated from FIG. 1, when not in use the sled assumes a flat configuration that can be stored easily in nearly any space a flat object roughly the height and width of a person could fit. The sled may be stored completely unfolded, or it may be stored with the side walls 34 folded over the bottom panel, to form a narrower aspect ratio. One convenient place the sled may be stored is under a patient's bed. The sled may also be stored in a nearby closet or unobtrusively along a wall. Because the sled is lightweight and flat, it can be stored nearly anywhere. As one example, a nurses' station in a hospital may be provided with a disposable or reusable package containing multiple evacuation sleds to serve the evacuation needs of all rooms served by the nurses at the nurses' station. A single package can contain a dozen or more sleds yet still be easily maneuverable by a single nurse during an emergency. Additionally, a package containing multiple sleds may be stored vertically to have a minimal storage footprint no larger than a small piece of hospital equipment.

Figure 4:
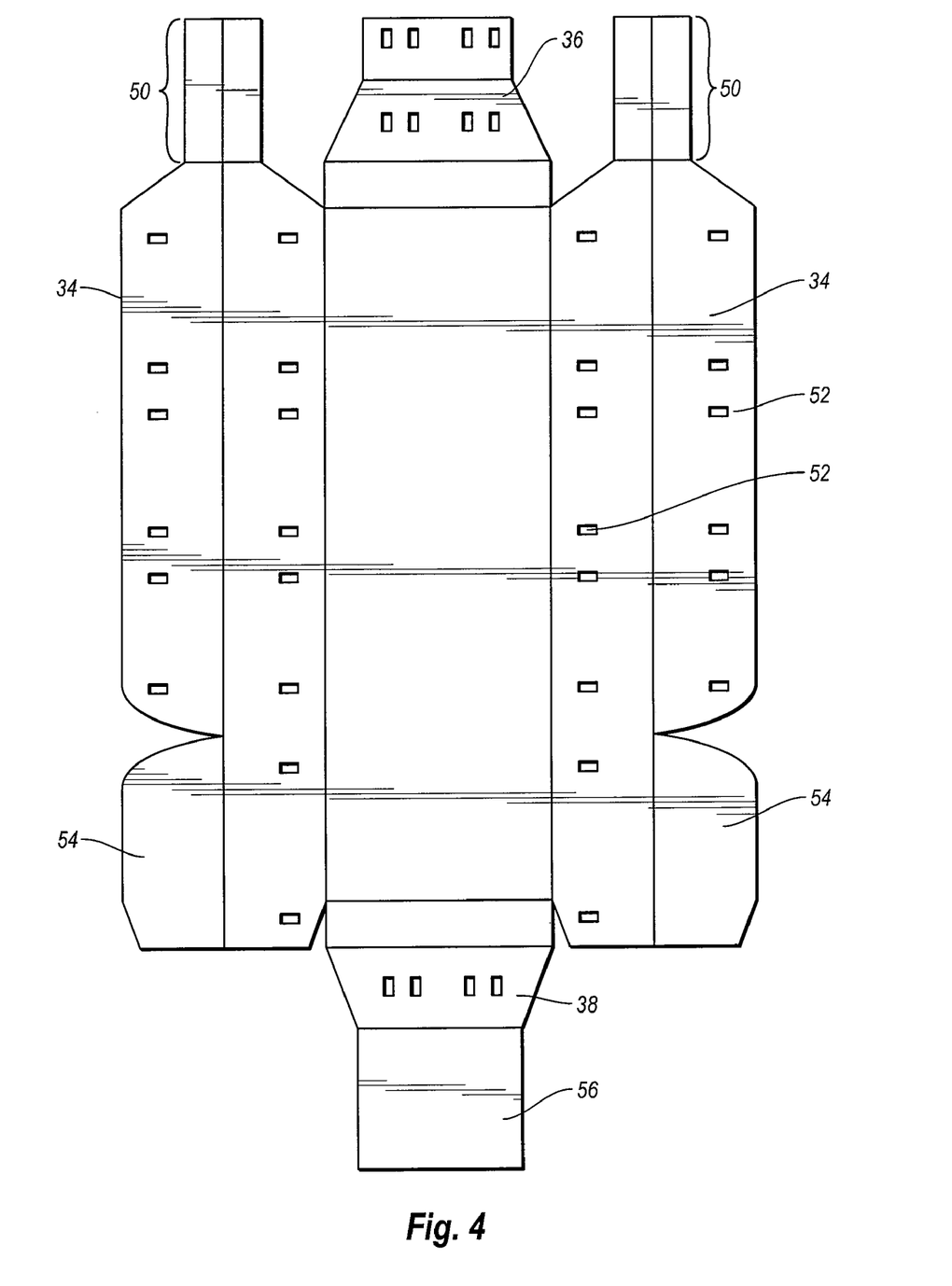
FIG. 4 shows a plan view of an alternate embodiment of the sled.

FIG. 4 shows another embodiment, highlighting several advantages that may be obtained with the invention. In this embodiment, side walls 34 and head wall 36 may be designed to be double layered for strength when in folded form. Side walls 34 have an extension tab 50 at the head end of the sled that folds so as to be under the fold of the head wall 36 when in folded form. This provides stability and rigidity around the head of the evacuee. Several strap holes 52 are also visible, the strap holes functioning to allow a circumferential strap to be placed around the sled for additional support and for carrying. At the foot of the sled, the walls 34, 38 are not double layered. Instead, the foot portion 54 of side walls 34 and the extension 56 of the foot wall are wrapped in the folded position so as to be above the legs of the evacuee, providing a cocoon-like effect for the folded sled.

Figure 5:
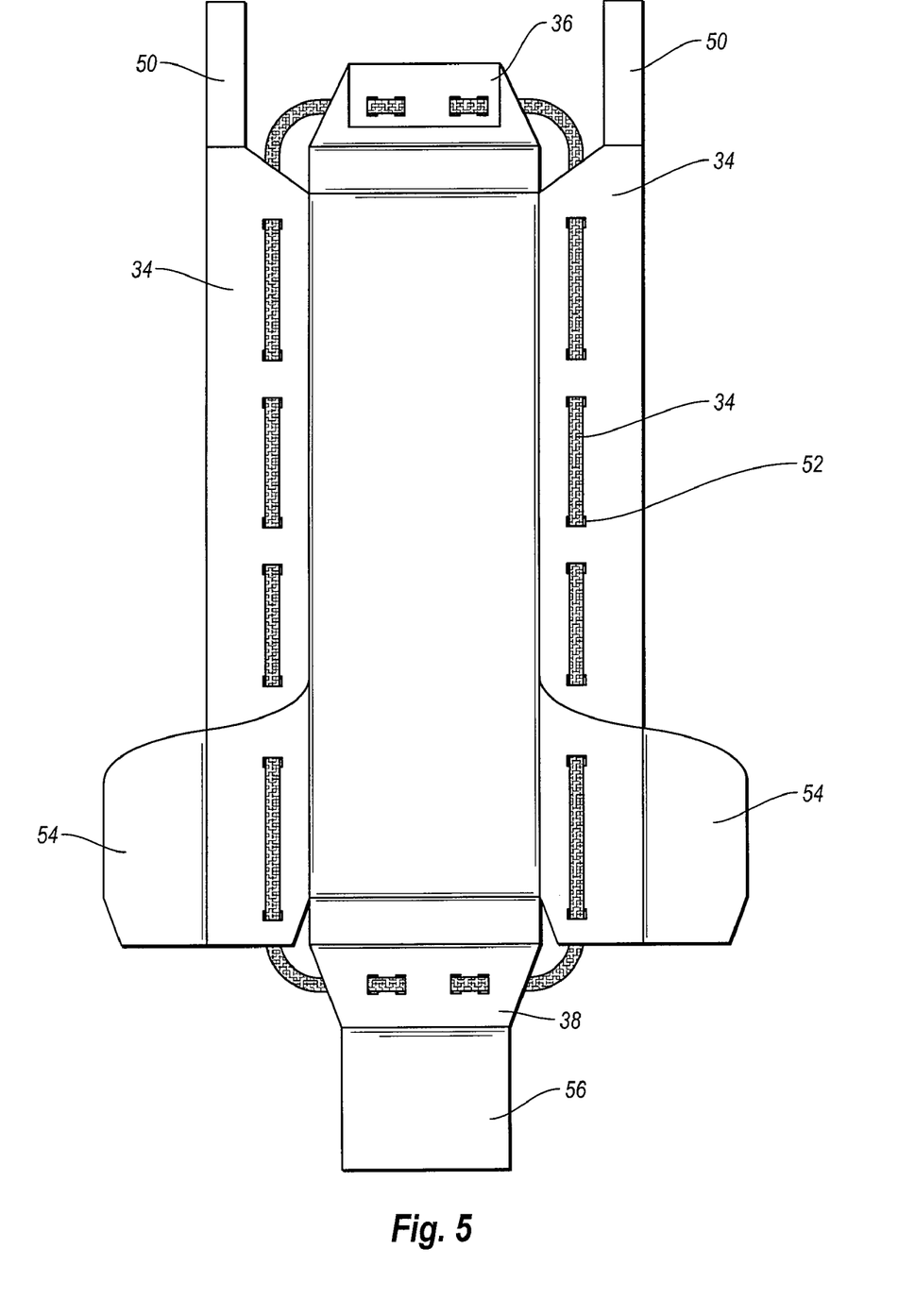
FIG. 5 shows a perspective view of a partially-folded form of the embodiment from FIG. 4.

FIG. 5 shows a partially-folded sled, including circumferential strap 44. In the Figure, the head-ward portions of the side walls 34 and the head wall 36 have been folded to make a double-thick wall. The strap 44 has been passed through the strap holes 52 in a weaving fashion to secure the folded portion of the side walls 34 and head wall 36. Although the strap 44 has been passed through the strap holes 52 in such a way as to form a complete circle, the partially-folded configuration is still able to lay flat due to slack in the strap 44. This partially folded configuration may not be the best for storage because of protruding unfolded elements, so the foot portions 54 of the side walls 34, the extension tabs 50, the foot wall 38 and extension 56, and the head wall 36 may all be additionally folded to form a more compact storage position. As can be appreciated from FIG. 5, folding the sled into its functioning position provides slack to the strap 44 that can be used to form handles for carrying or dragging the sled. The surfaces visibly displayed in FIG. 5 are all surfaces that will be directed toward the evacuee when the sled is in its completely-folded configuration.

Figures 6, 7:
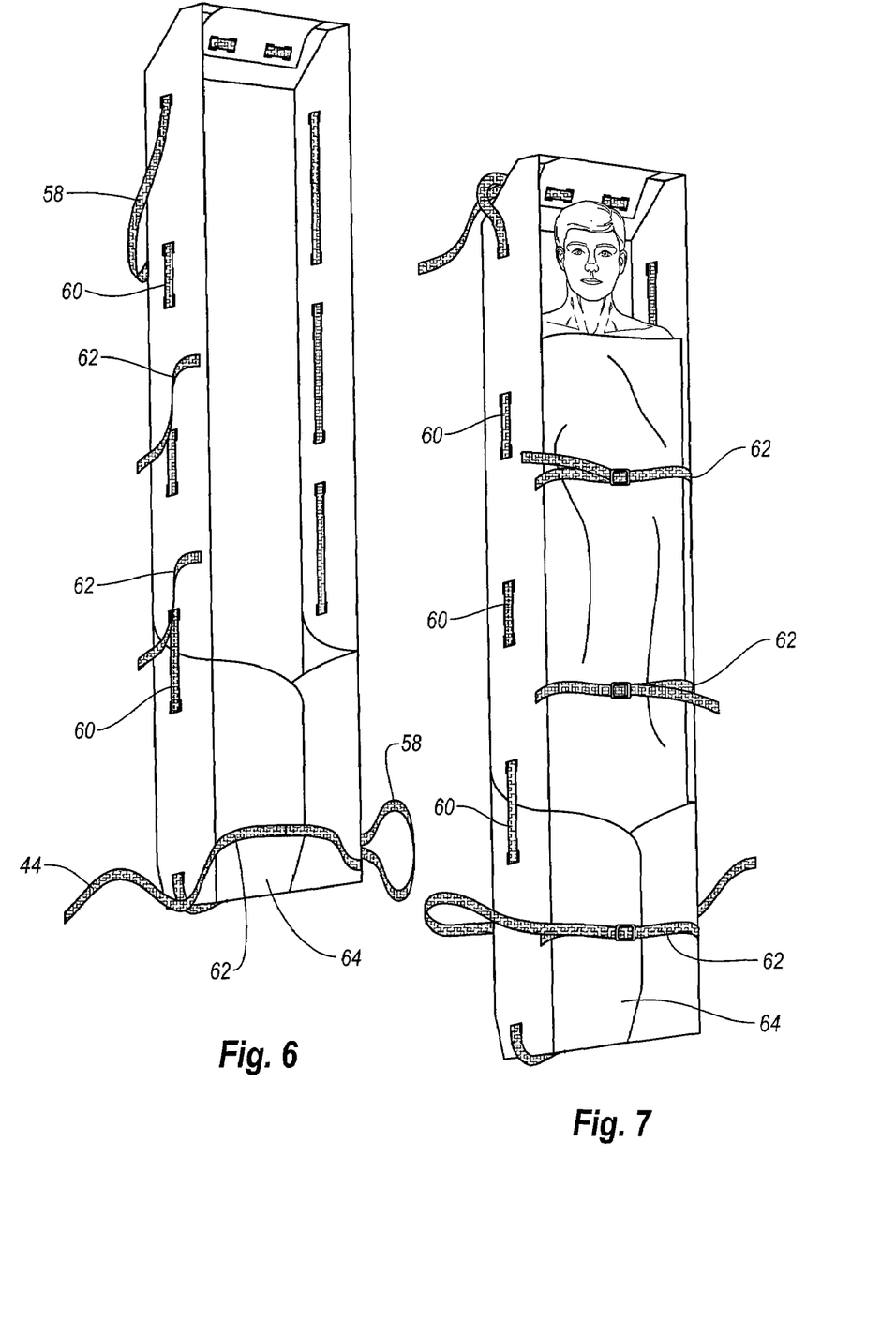
FIG. 6 shows a perspective view of a fully-folded embodiment of the evacuation sled.
FIG. 7 shows a perspective view of the embodiment from FIG. 6, showing a patient within the sled.

This folded configuration is shown in perspective view in FIGS. 6 and 7. In FIG. 6, a fully-folded sled is shown without an evacuee inside. FIG. 7 shows a sled containing an evacuee. In FIG. 6, the strap 44 has had its slack taken out to provide several large loops 58 that can serve as handles for the person pulling or carrying the evacuee, or the loops 58 may be used as attachment points for other ropes or harnesses, as will be described in detail below. The weaving nature of the strap 44 also provides several handles 60 that can be used to maneuver or lift the sled. When the handles 60 are to be used, the slack of the strap 44 may be locked in place to prevent the slack from returning to the handles. This may be done by means of a clip, a buckle, tying off the excess slack, or any other means known in the art for securing a rope or strap such as strap 44.

FIGS. 6 and 7 also show several evacuee-securing straps 62 in addition to strap 44. These evacuee-securing straps 62 may be placed in various locations and buckled or tied across the open top of the sled to secure the evacuee during transport. This is particularly helpful to ensure safety during descent of stairs or while traversing rougher terrain. As can be seen in these Figures, the foot end of the sled forms a cocoon portion 64 around the feet of the evacuee, and provides an added measure of safety to ensure that the evacuee stays in the sled even during descent of steep stairs, as the extension 56 of the foot wall 38 encases the feet and provides a strong barrier against the evacuee's sliding downward in the sled.

The sled described in the various embodiments above provides many advantages over other current evacuation devices. The sled is lightweight, easily and inexpensively manufactured, yet strong, rigid, and protective. The sled easily slides over the ground or around various obstacles, and has numerous points where it may be carried, dragged, or to which items may be attached. The sled also provides additional advantages, as will be described below.

It is anticipated that the sled may essentially be disposable, though it is sufficiently strong and durable that it may also be used repeatedly. Because it is manufactured at low cost, hospitals or other facilities may store enough sleds to evacuate the whole hospital or facility, stored under beds or centrally located. This provides a major advantage since patients or other evacuees may remain in the sled post-evacuation. The rescuer, staff, or other people evacuating the patients need not transfer evacuees from the sleds they are in to have enough sleds to continue evacuation. Instead, the sled remains with the evacuee and performs the function of surge capacity. In fact, any unused sleds may be easily removed from the facility and set up to provide additional surge capacity until a more permanent solution can be devised. This may be particularly advantageous in the case of large-scale disasters such as earthquakes or terrorist attacks.

In fact, even if a hospital need not be evacuated, the sled may still perform the function of providing surge capacity. The hospital or other facility simply leaves its patients in their beds, removes and/or sets up the sleds, and nearly instantly has additional temporary beds for incoming patients. In this way, a hospital or other facility can function at above-normal capacity for a time during the initial response to a disaster or other large-scale need. When the need for surge capacity is over, the sleds serving as temporary beds may be unfolded and stored again, or may serve as a convenient means for transporting the surge capacity patients to less-stressed facilities for more permanent treatment.

Figure 8:
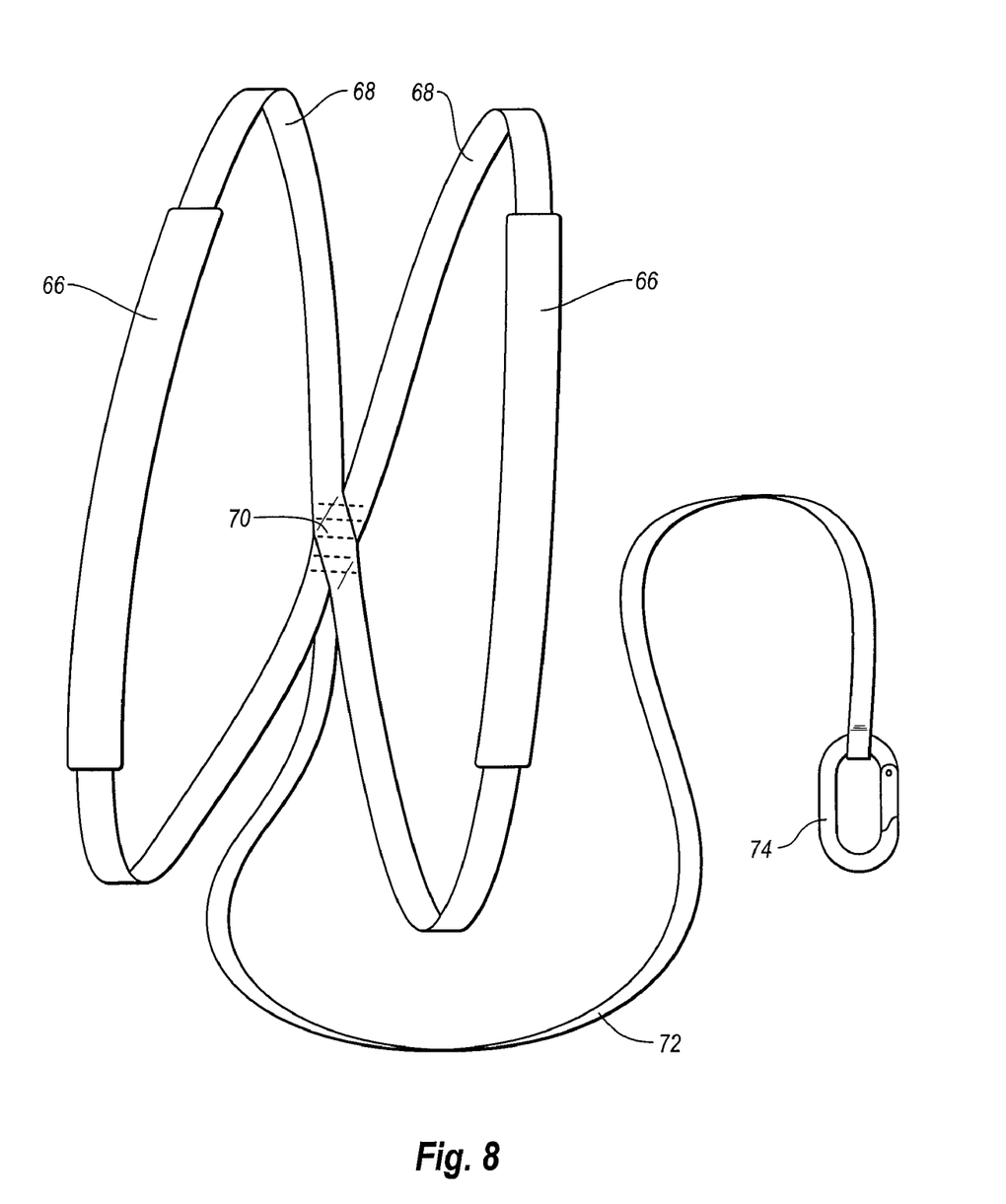
FIG. 8 shows a perspective view of a towing harness that may be used with the sled.

Occasionally, transport of evacuees must occur over a long horizontal distance, such as down a long hallway or away from a dangerously-damaged building. In such cases, bending over and dragging sleds by the loops in the strap or by the handles becomes impractical or requires a great deal of effort. To reduce the strain of long-distance hauling of evacuees in the sled, a harness may be provided to be worn by the person dragging the sledded evacuee. One sample harness is shown in FIG. 8. The harness is essentially a backpack without the pack portion of the backpack. Instead, two shoulder straps 66, which may be padded to increase the comfort of the wearer, are attached to two harness straps 68 which cross at a back intersection 70 of the harness. At the back intersection 70 of the harness where the straps 68 cross, a tow strap 72 is also attached that extends a sufficient length to provide relatively easy towing of a sled. The tow strap 72 terminates in a carabiner 74 or other clip, connecting device, or locking device that may be clipped or connected to the strap loops 58 at the head or foot of the sled seen in FIG. 6. The staff member or rescuer can then easily tow the sled by simply running against the harness, as a sled dog does. Of course, one of skill in the art will readily recognize that many other types of tow harnesses or tow strap extensions may be used to improve the ease of towing sledded evacuees.

In this way, it has been found that a single nurse can relatively easily tow a 220-pound (100-kilogram) sledded evacuee in most instances. However, in cases where the evacuee is heavier, the rescuer(s) are weaker or just tired, or more difficult terrain is encountered, a second harness-wearing individual can easily attach a second tow strap 72 to the strap loops 58 or the carabiner 74 to provide additional force. As can be imagined, a third or fourth towing person may be added as needed.

One situation where additional individuals for towing might be needed is in the case of patients needing intensive care and large amounts of equipment to ensure survival. Examples of patients requiring additional equipment for care include patients in intensive care units (ICUs), thoracic patients, and shock trauma patients. For some patients, the equipment necessary to ensure survival may be bulkier and heavier than the patient/evacuee him or herself. In such a case, the sled provides advantages previously unknown in the art. For such patients, a second and even a third sled may be provided in addition to the first sled containing the patient. The additional sled(s) may be fitted with a form-fitting foam insert that completely fills the sled to prevent unwanted movement of support equipment. The foam insert may have fitted foam cutouts that precisely fit the semi-portable equipment necessary to ensure survival of the evacuees needing intensive care. The sleds can then be dragged together to continue critical life support functions at all times.

When multiple sleds are being transported together, such as for critical-care patients, the sleds may be attached to one another in daisy-chain fashion, or may be attached side-by-side to prevent disruption of critical care services. This is possible due to the narrow profile of the sleds, in contrast to the wide profile of many hospital beds that might otherwise be used for evacuation. To attach sleds, the strap loops 58 or handles 60 of different sleds are simply attached to one another, as with a carabiner or other device, as described above. Then the multiple sleds may be moved as a unit, and may remain with an evacuated patient to serve as surge capacity and continue care until more permanent facilities may be reached. In this way, many critical care patients that might otherwise perish in the event of a major emergency will be better able to survive the emergency until the reestablishment of a proper critical care environment.

Another advantage of the sled is its ability to provide controlled descents down stairways with a single individual, no matter how heavy the evacuee. To accomplish this, a belay device commonly used in rock climbing is located at the top of stairways to be descended. This device may be permanently provided at this location, or may be provided with the sled and attached at the top of the stairway as needed in an emergency. Usually, one belay device is used per flight of stairs to be descended. The evacuee is transported by carrying or dragging to the top of a flight of stairs, and a climbing rope is attached at the head of the sled and then through the belay device. An 8-mm climbing rope has been found to be sufficient for the task in most instances. For simplicity and rapidity of evacuation, a rope may be provided attached to each sled and then quickly placed in the belay device as each evacuee arrives at the top of the stairs.

After the belay device is attached to the rope, the sled is pushed or pulled over the top of the stairs until the patient's weight starts the sled sliding down the stairs. As this is done, the person activating the belay device allows a controlled amount of rope to pass through the device as needed to allow the sled to move to the edge of the stairs. As the sled starts to slide down the stairs, the person continues to control the amount of rope passing through the belay device, readily controlling the descent down the stairs. Thus the sledded evacuee may readily and safely descend a stairway or hill of almost any size and steepness.

FIG. 9 shows another embodiment of the sled and highlights the ease of use of the sled and ease of assembly of the sled, even around an evacuee placed on an unfolded sled. FIG. 9 shows the steps of assembly of the sled in five easy steps. FIG. 9a shows a sled in unfolded configuration with an evacuee shown in dotted line form lying on the sled. To reach this state, the sled was taken from storage (either under the bed, under the mattress, or from some other storage location) and was placed under the patient by methods commonly known for moving non-ambulatory patients around. FIG. 9a shows the primary rope or strap 44 encircling the sled with enough slack to allow the sled to lie flat. The Figure also shows evacuee-securing straps 62 in their unbuckled state. Of the evacuee-securing straps 62, a foot evacuee-securing strap 76 is particularly long to allow the formation of a secure cocoon portion 64 as discussed above.

Figure 9A:
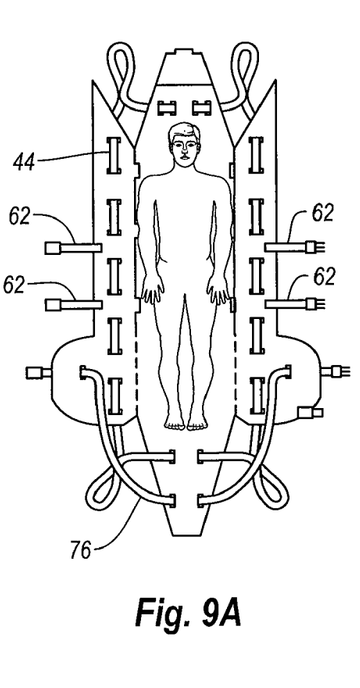
FIGS. 9a-9e show steps in folding an embodiment of the sled from its unfolded form to its completely-folded form.
Figures 9B, 9C:
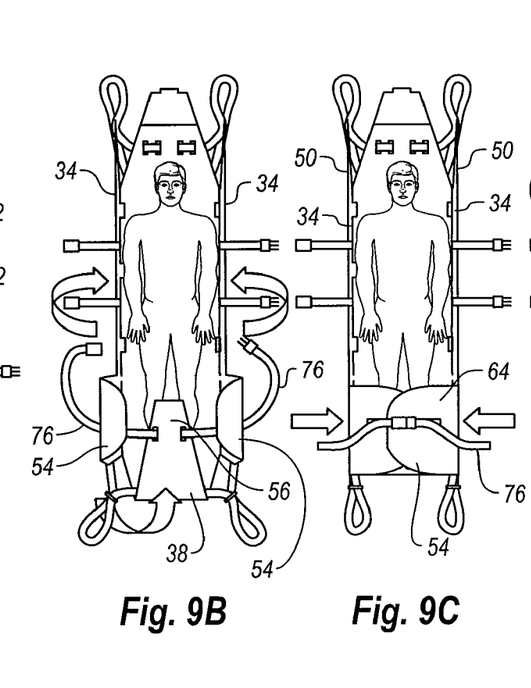

FIG. 9b shows one step of forming the sled after placing the evacuee on the sled. In this Figure, the side walls 34 are folded up according to the arrows shown. The foot wall 38 and extension 56 are also folded up and over the evacuee. This provides some slack in the foot evacuee-securing strap 76, which is removed by pulling the foot evacuee-securing strap 76 through the foot portions 54 of the side walls 34.

Figure 9D:
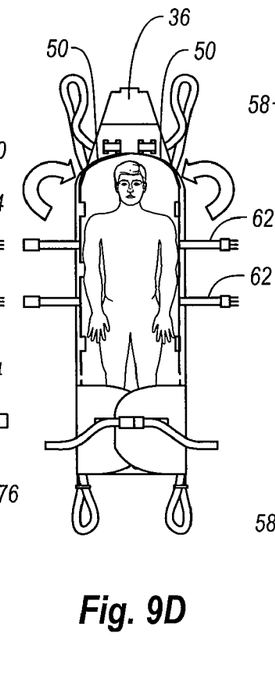
Figure 9E:
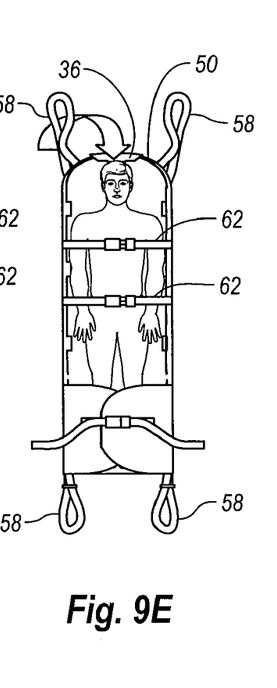

Another step is shown in FIG. 9c, where the foot evacuee-securing strap 76 is fastened together and tightened. This draws the foot portions 54 of the side walls 34 together to form the cocoon portion 64 of the sled. This prevents the evacuee from inadvertently sliding out the foot of the sled, such as during a feet-first descent of a stairwell as described above. As shown in FIG. 9d, the extension tabs 50 are drawn together above the head of the evacuee. The head wall 36 is folded up and over the extension tabs 50 to securely form the head of the sled, as seen in FIG. 9e. The other evacuee-securing straps 62 are also fastened to completely secure the evacuee. In its final form, the sled has strap loops 58 at every corner to provide easy handling of the sled, although the strap 44 may have its slack taken up in other ways, such as entirely at a single corner or other location or locations of the sled, without departing from the spirit of the invention. Disassembly and storage of the sled after use may be accomplished by performing the reverse of the steps shown in FIGS. 9a-9e.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

The invention claimed is:

1. An evacuation sled for providing for the evacuation of non-ambulatory individuals from a facility in the case of an emergency and for providing temporary bedding for non-ambulatory individuals, the sled comprising:
   a sled body comprising:
      a bottom panel;
      a pair of side walls attached to the bottom panel on opposite ends of the bottom panel;
      a head wall attached to the bottom panel on an end of the bottom panel not attached to a side wall; and
      a foot wall attached to the bottom panel on an end opposite the end to which the head wall is attached;

wherein the sled body is configured so that it may assume a substantially-planar flat unfolded configuration and is further configured so that it may assume a non-planar folded configuration, the non-planar folded configuration sized and configured to substantially enclose a non-ambulatory person in a horizontal position with the bottom panel horizontal underneath the person, the head wall extending from the bottom panel above the head of the person, the side walls extending substantially vertically from the bottom panel along the sides of the person, and the foot wall extending from the bottom panel below the feet of the person; and a strap secured to the sled body, the strap configured to provide a means for maneuvering the sled body with the person substantially enclosed therein when the sled body is in its non-planar folded configuration.

2. A sled as in claim 1, the sled body further comprising:
a cocoon portion formed from at least one of:
  one of the pair of side walls; and
  the foot wall;
the cocoon portion being configured to further enclose the person by surrounding at least the lower legs of the person above the lower legs.

3. The sled of claim 1 wherein the strap passes through holes in the walls of the sled body in a looping fashion to secure the strap to the sled body.

4. The sled of claim 1 further comprising a towing harness configured to be worn by a human and reversibly attached to at least one of the sled body and the strap.

5. The sled of claim 1 further comprising a fitted foam insert sized and configured to snugly fit within the sled body when the sled body is in its non-planar folded position, the insert comprising cutouts sized and shaped to accept urgent-care medical equipment therein.

6. The sled of claim 1 further comprising:
a belay device firmly attached to an object near the top of a stairway; and
a rope attached to the sled and passing through the belay device, the belay device and rope configured to permit the controlled descent of the sled down the stairway in a feet-first direction.

7. The sled of claim 1 used as an evacuation sled.

8. The sled of claim 1 used as a temporary bed to provide surge capacity.

9. The sled of claim 1 wherein the sled body comprises a unitary piece of material.

10. The sled of claim 9 wherein the material is corrugated polypropylene.

11. The sled of claim 1 wherein the sled body comprises corrugated polypropylene.

12. The sled of claim 1 further comprising a second strap that passes from one side wall to the other side wall over the person to secure the person within the non-planar folded configuration of the sled body.

13. The sled of claim 1 further comprising a plurality of straps passing from one side wall to the other side wall over the person to secure the person within the non-planar folded configuration of the sled body.

14. An evacuation sled capable of being used to evacuate a non-ambulatory person from a facility in case of an emergency and further capable of being used as a temporary bed to provide surge capacity to the facility in the case of an emergency, the sled comprising:

a substantially-planar unfolded configuration comprising:

a rectangular bottom sized to provide a surface upon which a person may lie in a horizontal position with the bottom underneath the person, the bottom having a head end and a foot end and two side ends;

a head panel attached to the bottom at the head end, the head panel including an extension that extends from the head panel in a direction away from the foot end of the bottom;

a foot panel attached to the bottom at the foot end, the foot panel including an extension that extends from the foot panel in a direction away from the head end of the bottom;

a pair of side panels attached to the bottom at the side ends, each of the side panels having a foot portion near the foot end of the bottom wherein the side panel extends further away from the bottom than along the remainder of the side panel's length, and each of the side panels having an extension tab near the head end of the bottom extending from the side panel in a direction away from the foot end of the bottom panel;

a first strap attached to the sled and configured to allow the sled to rest in its substantially-planar unfolded configuration; and a second strap attached to the foot portions of the side panels and configured to allow the sled to rest in its substantially-planar unfolded configuration; and a non-planar folded configuration, wherein in the non-planar folded configuration the bottom rests in a horizontal position, the side panels extend substantially upward from the bottom, the extension tabs of the side panels extend toward each other, the head panel extends substantially upward from the bottom and the extension of the head panel wraps around the extension tabs, the foot panel extends substantially upward and the extension of the foot panel extends substantially toward the head end of the sled, and the foot portions of the side panels extend toward each other and overlap with the extension of the foot panel, wherein the second strap is configured to secure the foot portions of the side panels and the extension of the foot panel together to form a cocoon portion of the sled.

15. The sled of claim 14 wherein the bottom, the panels, the extensions, the foot portions, and the extension tabs comprise a unitary piece of material.

16. The sled of claim 14 wherein the bottom, the panels, the extensions, the foot portions, and the extension tabs comprise polypropylene.

17. The sled of claim 14 further comprising a foam insert that is sized and shaped to fit snugly within the sled in its non-planar folded configuration, the insert comprising cutouts sized and shaped to accept medical equipment necessary for providing for the urgent care needs of a patient.

18. The sled of claim 14 wherein the sled is configured to be used as a temporary bed when in its non-planar folded configuration to provide surge capacity.

19. The sled of claim 14 wherein the sled is configured to be used as an evacuation sled when in its non-planar folded configuration.

20. The sled of claim 14 further comprising a strap extending from one side panel to the other side panel and configured to pass over the person within the sled when the sled is in its non-planar folded configuration.

* * * * *